Nov. 19, 1940. R. H. SIMONDS 2,222,445
OPHTHALMIC MOUNTING
Filed Dec. 31, 1937
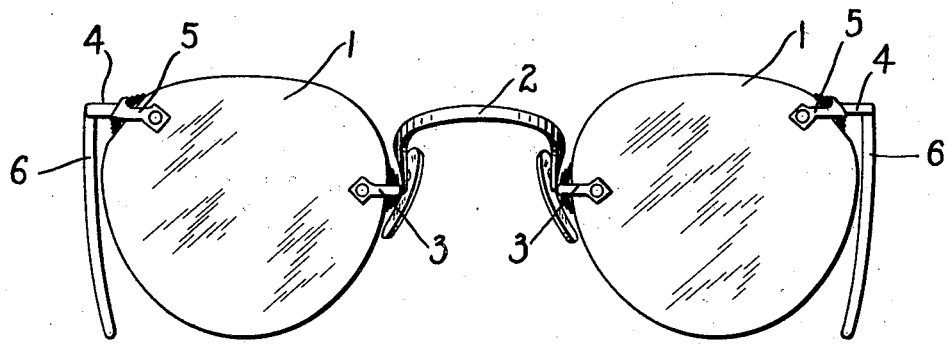
Fig. I
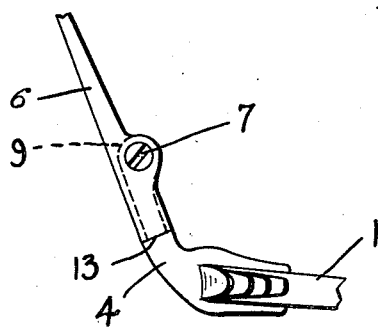
Fig. II
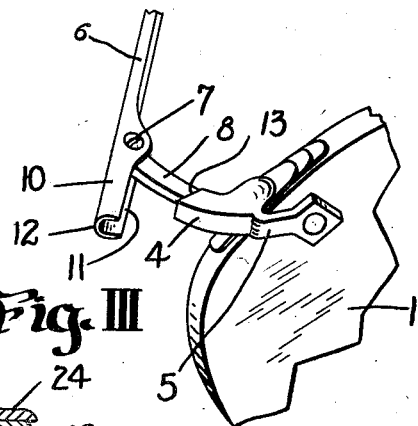
Fig. III
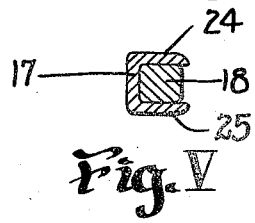
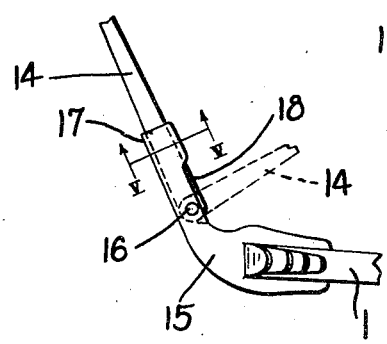
Fig. IV
INVENTOR.
ROYAL H. SIMONDS
BY Harry H. Styll
ATTORNEY.

Patented Nov. 19, 1940

2,222,445

UNITED STATES PATENT OFFICE 2,222,445

OPHTHALMIC MOUNTING

Royal H. Simonds, Southbridge, Mass., assignor to American Optical Company, Southbridge, Mass., a voluntary association of Massachusetts Application December 31, 1937, Serial No. 182,703

2 Claims. (Cl. 88—53)

This invention relates to improvements in ophthalmic mountings and has particular reference to an improved construction of such mountings.

One of the principal objects of the invention is to provide a novel temple and temple support wherein the temple, when in its position of use, will be rigidly supported in proper angular relation with the plane of the lens.

Another object of the invention is to provide a temple and temple support to which the temple is pivotally connected, having portions which are adapted to assume an overlapping fitted relation with each other when the temple is extended and in its normal position of use.

Another object of the invention is to provide a temple and temple support with associated parts which, when the temple is pivoted relative to said support to its position of use, will automatically move said associated parts into overlapping fitted relation with each other.

Another object is to provide novel means of supporting the temple against sagging when in extended position of use relative to the lenses.

Other objects and advantages of the invention will become apparent from the following description taken in connection with the accompanying drawing and it will be apparent that many changes may be made in the details of construction, arrangement of parts and shown and described without departing from the spirit of the invention as expressed in the accompanying claims. I, therefore, do not wish to be limited to the exact details shown and described as the preferred forms only have been given by way of illustration.

Referring to the drawing:

Fig. I is a front elevation of an ophthalmic mounting embodying the invention;

Fig. II is a partial fragmentary plan view of one of the temples and temple supports embodying the invention;

Fig. III is a fragmentary perspective view of the construction shown in Fig. II;

Fig. IV is a view similar to Fig. II of a modified form of the invention;

Fig. V is an enlarged sectional view taken as on line V—V of Fig. IV.

Much difficulty has been encountered in the past in ophthalmic mountings of the type wherein the temples are pivotally connected to suitable supports formed on the mountings.

This difficulty, in many instances, was due to the looseness and play in the pivotal connection to the support or due to wear of the parts.

The lenses of an ophthalmic mounting are in most instances designed to be supported at a given position before the eyes with the plane of said lenses tilted forwardly at the top so as to be at an angle to the normal line of straight ahead vision through said lenses. This angle is obtained, in most instances, by angling the temple and temple supports downwardly relative to the plane of the lenses within the limits of a right angle, that is, so that the angle of the center line of the temple and temple support when extended relative to the plane of the lens below said temple and temple support will be less than a right angle. With most prior art constructions, the connection of the temple to the temple support has been such that much difficulty has been encountered in maintaining this desired angular relation. It, therefore, is one of the primary objects of this invention to overcome the above difficulties by providing a temple and temple support, which when pivotally connected together and in extended position the said temple and support will have a relatively long surface bearing contact with each other adjacent said pivotal connection and will be such that the angular relation of the center line of the temple and support relative to the plane of the lenses will be more positively maintained during use.

Referring more particularly to the drawing, wherein like characters of reference designate like parts throughout the several views, the device embodying the invention comprises broadly a pair of lenses 1 connected to a bridge member 2 by suitable lens straps or lens holding means 3. Although applicant has shown a rimless type mounting it is to be understood that the improved temples and temple supports may be applied to a frame type spectacle. The temple supports 4, in this particular instance, are secured to the lenses by suitable lens holding means 5, but in a frame type structure the said supports are secured to the lens rims of the frame.

The temples 6, as shown in Figs. I to III inclusive, are pivotally connected to the supports 4 by screws or like means 7. In this particular instance the support 4 has a reduced relatively long rearwardly extending portion 8 having a pivot hinge connection 9 adjacent its rear-most end. The temple 6 is provided with a portion 10, extending forwardly of the pivot connection 7, which has a longitudinal groove 11 therein of such cross-sectional dimension as to slide over the portion 8 when the temple is extended and assumes a snug fit therewith. The portion 10 has a U-shaped cross-section which is so dimensioned as to receive the portion 8 within the groove 11 and provides a long surface bearing therewith when extended as shown in Fig. III. The end 12 of the extension 10 is adapted to move into closely fitted relation with a shouldered portion 13 formed on the support 4 as illustrated in Figs. II and III. It is apparent that when the temple is extended the long bearing surface between the portions 10 and 8 will prevent sagging of the temple and will more positively maintain the desired angular relation between the center line of the temple and the plane of the lenses.

In Fig. IV there is shown a slightly modified construction wherein the temple 14 is pivoted to the support 15 by a suitable pin, screw or other means 16. In this instance the support 15 is provided with a grooved rearward extension 17 in which the temple bar 18 moves when pivoted from its folded relation with the lenses 1, as illustrated by the dash lines in Fig. IV, to its extended relation as illustrated by the full line in Fig. IV. The fit of the portion 18 within the grooved portion 17 is shown in the cross-section in Fig. V. This construction also provides a long bearing surface which prevents sagging of the temple during use.

It will be noted that the outer surfaces of the temple and temple supports, in either of the above constructions, conceals the pivot connection and interfitted portions of the said supports and temples when the mounting is viewed from the side.

In all of the above constructions there are provided novel means of securing a temple to its temple support so that the said temple may be folded or extended as is usual in the art and which, when in extended position, the said temple will be positively retained against looseness and play about its pivotal connection to the support and will more positively maintain its desired angular relation with the plane of the lens.

If desired, the side portions 24 and 25 of the projection 10 or 17, as the case may be, may be formed resilient so as to grip the portion 18 or 8 when the temple is extended.

From the foregoing description it will be seen that simple, efficient and economical means have been provided for accomplishing all of the objects and advantages of the invention.

Having described my invention, I claim:

1. In an ophthalmic mounting, the combination of an endpiece having a reduced extension thereon, a temple having a pivotal connection adjacent the free end of said reduced extension and having a channel-like portion extending forwardly from said pivotal connection and being adapted to fit over said reduced extension with its outer surfaces substantially flush with the remaining outer surfaces of said endpiece.

2. In an ophthalmic mounting, the combination of a lens holding member having a relatively long endpiece member extending rearwardly thereof when in position on the lens and having an outer edge surface curving rearwardly from adjacent the lens holding member when said lens holding member is in position on the lens and a temple member pivotally connected to said endpiece member, one of said members having a relatively long channel-like portion with resilient side walls extending throughout the length thereof to one side of the pivotal connection to a point substantially spaced from said pivotal connection and the other of said members having a solid body portion of a thickness slightly greater than the normal distance between the resilient side walls of said channel adapted to fit within said channel-like member by movement thereof on the pivot so as to be resiliently engaged by said side walls when in said channel with the said members being so related with each other that when the temple is folded the distance between the resilient side walls will be less than the thickness of the solid body portion of the other member with the said solid portion being adapted to wedge the resilient side walls outwardly against the resiliency of said walls when the temple is moved to extended position so that the said resilient side walls will resiliently and frictionally hold the temple in said extended position internally of the channel-like member and thereby prevent sagging of the temple relative to the pivotal connection when in use.

ROYAL H. SIMONDS.